United States Patent [19]
Petty

[11] Patent Number: 5,750,225
[45] Date of Patent: May 12, 1998

[54] LAMINATED VAPOR BARRIER

[75] Inventor: Charles J. Petty, Blairstown, N.J.

[73] Assignee: Compac Corporation, Netcong, N.J.

[21] Appl. No.: 452,297

[22] Filed: May 26, 1995

[51] Int. Cl.$^6$ .................... B32B 27/36; C09J 7/02
[52] U.S. Cl. .................. 428/362; 428/35.8; 428/379;
428/388; 428/335; 428/339; 428/341; 428/344;
428/355; 428/354; 428/906
[58] Field of Search ................... 428/35.8, 36.2,
428/379, 388, 335, 339, 341, 344, 354,
355, 906

[56] References Cited

U.S. PATENT DOCUMENTS

| | | |
|---|---|---|
| 2,777,786 | 1/1957 | Schwartz et al. |
| 2,798,510 | 7/1957 | Martin et al. |
| 3,092,529 | 6/1963 | Pearson. |
| 3,442,750 | 5/1969 | Wilcox. |
| 4,086,384 | 4/1978 | Adelman et al. |
| 4,188,248 | 2/1980 | Millgardh et al. |
| 4,280,536 | 7/1981 | Grant. |
| 4,772,507 | 9/1988 | Leo, Jr. et al. |
| 4,778,700 | 10/1988 | Pereira. |
| 4,780,347 | 10/1988 | Cohen. |

*Primary Examiner*—Richard Weisberger
*Attorney, Agent, or Firm*—Edgar A. Zarins; Malcolm L. Sutherland

[57] ABSTRACT

A vapor barrier laminate for use in insulation applications as a facing material. A fiberglass yarn or scrim is positioned between layers of kraft paper. An aluminum foil is adhered directly to the outer kraft paper layer. The paper to foil bond and the paper to paper bond are accomplished with a flame retardant adhesive. The resulting heavier and thicker laminate provides increased rigidity, a smoother outer surface for better abrasion resistance, and a greater tensile strength. Use of the laminate in duct board facing improves the strength of the duct board while facilitating tape adherence for sealing gaps between board sections.

15 Claims, 1 Drawing Sheet

LAMINATED VAPOR BARRIER

BACKGROUND OF INVENTION

I. Field of the Invention

This invention relates to a vapor barrier used in insulation applications as a facing material and, in particular, to a laminated vapor barrier incorporating improved adhesion between layers resulting in increased rigidity and tensile strength.

II. Description of the Prior Art

Vapor barriers have proven to be an effective means of improving the insulative properties of insulation panels. The insulation panels may comprise flexible or rigid insulative material. The vapor barrier is applied to what is intended as the exterior surface of the insulation to retard the flow of moisture through the insulation. Paper, metal foils, or specialized kraft paper have been utilized as vapor barriers in prior known insulation panels. More recently, combinations have been applied to further improve the vapor insulative properties.

A widely utilized vapor barrier is a foil-scrim-kraft (FSK) combination. The current industry standard FSK consists of 0.0007 inch thick aluminum foil bonded to a 30 lb./ream natural kraft paper using flame retardant adhesive. Between the foil and paper, fiberglass yarn laid in a diamond pattern forms a reinforcing net for the vapor barrier. However, the reinforcing scrim forms protrusions in the outer foil surface creating an irregular surface. A scuffing or abrading action across the surface of the facing will tear the foil where it crosses the yarn. In addition, the irregular surface is less receptive to pressure sensitive or heat seal tapes used to seal gaps or seams of the insulation. One application of this type of vapor barrier is as a duct board facing. The duct board is typically cut, formed and sealed into duct sections which must be sealed. Accordingly, the sealing tape is applied to the irregular outer surface of the vapor barrier.

SUMMARY OF THE PRESENT INVENTION

The present invention overcomes the disadvantages of the prior known vapor barriers by providing a laminate of foil-scrim-kraft with increased rigidity, improved surface abrasion resistance, a smoother face surface and increased tensile strength.

The improved vapor barrier laminate of the present invention comprises an inner paper layer and an intermediate paper layer having a fiberglass scrim bonded therebetween. Bonded to the intermediate paper layer is a layer of aluminum foil. A flame retardant adhesive is preferably used to bond the two paper layers and the foil layer to the paper layer. The result is a heavier and thicker facing laminate which can bridge irregularities of the insulation board. Additionally, the combination of the foil and intermediate paper layer over the fiberglass yarn creates a smoother outer foil surface. The yarn protrudes to a lesser degree because the foil/paper web is less compliant creating a surface approaching that of sheet aluminum.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which.

FIGURE is a perspective view of a vapor barrier facing of the present invention exposing the layers thereof.

DETAIL DESCRIPTION OF A PREFERRED EMBODIMENT OF THE PRESENT INVENTION

Figure 1:
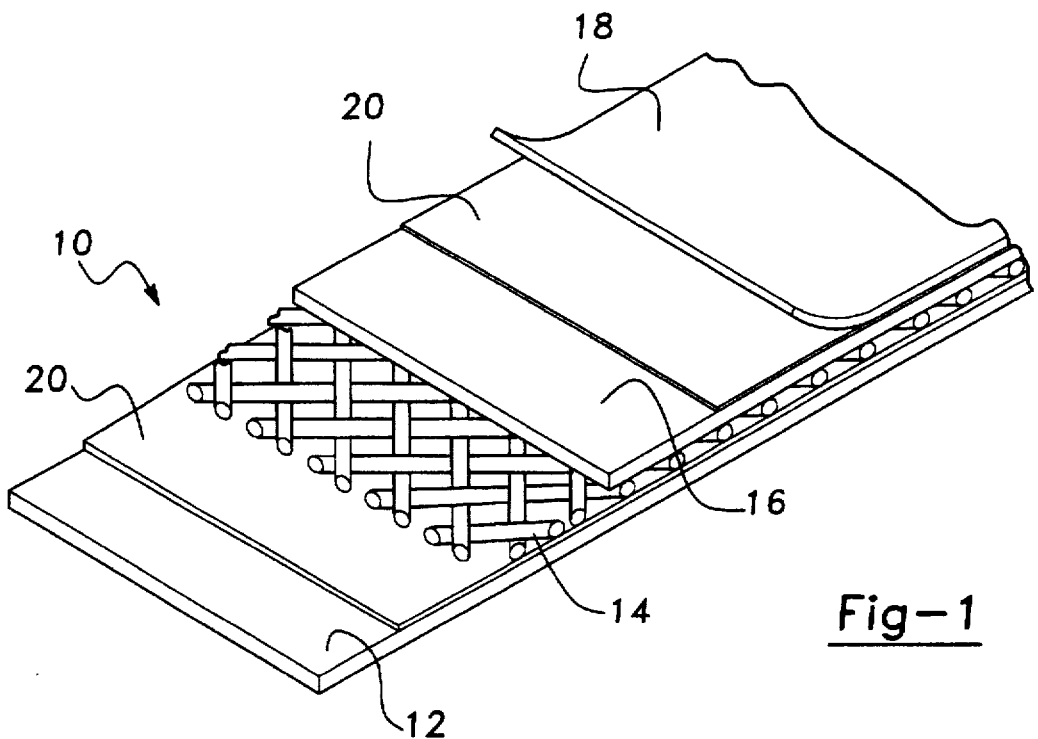
Figure 2:
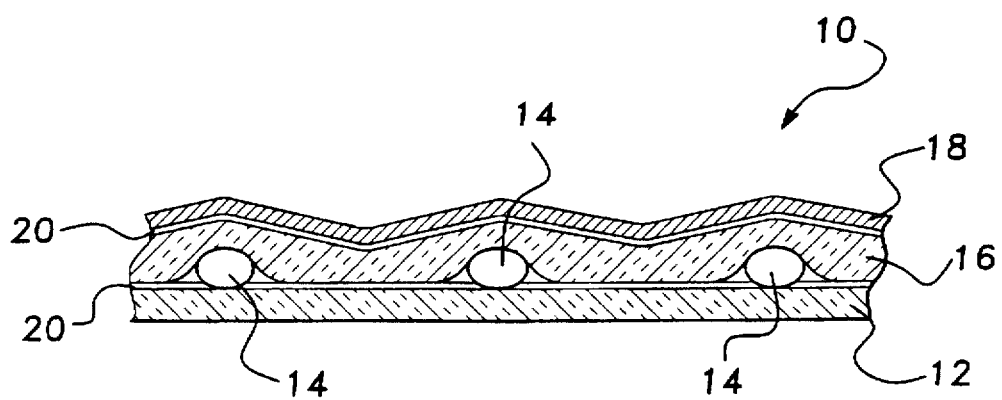
FIG. 2 is an enlarged cross-sectional view of the vapor barrier facing.

Referring to the drawing, there is shown a laminated vapor barrier 10 intended to be used as a facing for an insulation panel (not shown). The vapor barrier facing 10 is typically bonded to a flexible or rigid insulation panel to provide added insulation properties while also retarding the flow of moisture through the insulation. Furthermore, the facing barrier 10 covers the insulation material which cannot remain exposed to the living area. The barrier laminate 10 also facilitates handling and cutting of the insulation by bonding the insulation material.

The facing barrier 10 of the present invention includes an inner paper layer 12, a reinforcing fiberglass yarn 14, an intermediate paper layer 16 and an outer foil layer 18. An adhesive 20 is used to bond the layers of the laminate 10 together. Thus, in contrast to the prior known vapor barriers, the intermediate paper layer 18 is utilized to provide the improved properties of the present invention.

In a preferred embodiment of the vapor barrier 10, the inner paper layer 12 is a 20 lb. kraft paper and the intermediate paper layer 16 is a 40 lb. kraft paper. The foil layer 18 is preferably a 0.00035 inch thick aluminum foil bonded directly to the intermediate paper layer 16. As a result, a direct foil 18 to paper 16 lamination provides a 100% foil bond as compared to the partial bond of prior known laminates because of the interposed yarn web.

The resulting laminate is approximately 20% heavier and 40% thicker than the conventional prior known barriers. This allows the facing to bridge surface irregularities of the insulation panel to which the barrier 10 is bonded, improving the appearance of the insulation panel and creating a more even surface for adjoining adjacent sections. Furthermore, by bonding the foil 18 and paper 16 directly with the yarn 14 underneath, a smoother outer foil surface is created. The yarn 14 protrudes to a lesser degree than the prior known laminates because the foil/paper web is less pliable and approximately six times thicker than the simple foil layer of prior known barriers. This creates a smoother surface mimicking sheet aluminum which will better accept pressure sensitive or heat seal tape. The present invention, by combining a lighter gauge aluminum foil 18 directly with a paper layer 16 creates an outer layer which functions thicker than the currently used foil layer. As a result, the barrier 10 is more resistant to abrasion because of the foil/paper layer and less extreme transitions over the yarn threads 14. Finally, the construction of the present invention provides a significant increase in the tensile strength of the barrier 10. When applied to an insulation panel, the vapor barrier facing 10 of the present invention makes the panel stronger and more rugged to withstand the rigors of fabrication and installation.

The foregoing detailed description has been given for clearness of understanding only and no unnecessary limitations should be understood therefrom as some modifications will be obvious to those skilled in the art without departing from the scope and spirit of the appended claims.

What is claimed is:

1. A laminated facing barrier for insulation applications comprising:

a first kraft paper insulating support sheet having a first surface;

a reinforcing scrim web bonded to said first side of said first kraft paper insulating support sheet;

a second kraft paper insulating support sheet having a first surface adhesively bonded to said scrim web and first kraft paper insulating support sheet and a second surface; and a vapor barrier sheet adhesively bonded to said second surface of said second kraft paper insulating support sheet.

2. The barrier as defined in claim 1 wherein said vapor barrier sheet is bonded to said second insulating support sheet and said second insulating support sheet and scrim web are bonded to said first insulating support sheet with a flame retardant adhesive.

3. The barrier as defined in claim 1 wherein said second insulating support sheet has a material thickness greater than said first insulating support sheet.

4. The barrier as defined in claim 3 wherein said first insulating support sheet is a 20 lb. kraft paper.

5. The barrier as defined in claim 4 wherein said second insulating support sheet is a 40 lb. kraft paper.

6. The barrier as defined in claim 3 wherein said vapor barrier sheet is a metallic foil bonded directly to said second insulating support sheet whereby said second insulating support sheet separates said metallic foil from said scrim web.

7. The barrier as defined in claim 6 wherein said metallic foil has a material thickness of 0.00035 inches.

8. The barrier as defined in claim 6 wherein said reinforcing web is a fiberglass web consisting of a plurality of fiberglass strands for reinforcement.

9. A laminated facing barrier for insulation applications comprising:

a first kraft paper sheet having a first surface;

a reinforcing fiberglass scrim web adhesively bonded to said first side of said first kraft paper sheet;

a second kraft paper sheet having a first surface adhesively bonded to said reinforcing web and first kraft paper sheet and a second surface; and a metal foil sheet bonded to said second surface of said second kraft paper sheet.

10. The barrier as defined in claim 9 wherein said second paper sheet has a greater material thickness than said first paper sheet.

11. The barrier as defined in claim 10 wherein said second paper sheet is a 40 lb. kraft paper and said first paper sheet is a 20 lb. kraft paper.

12. The barrier as defined in claim 10 wherein said reinforcing fiberglass scrim web includes a plurality of interwoven fiberglass strands.

13. The barrier as defined in claim 12 wherein said metal foil sheet is an aluminum foil having a material thickness of 0.00035 inches, said foil bonded directly to said second paper sheet whereby said second paper sheet separates said foil from said fiberglass strands.

14. A laminated facing barrier for application to an insulation panel, said facing barrier providing support and insulative properties to the insulation panel, said facing barrier comprising:

a first kraft paper insulating support sheet having a first surface and a second surface;

a reinforcing scrim web adhesively bonded to said first surface of said first kraft paper insulating support sheet;

a second kraft paper insulating support sheet having a first surface adhesively bonded to said reinforcing web and first kraft paper support sheet and a second surface, said second kraft paper insulating support sheet having a material thickness greater than said first kraft paper insulating support sheet; and a metallic foil sheet bonded to said second surface of said second kraft paper insulating support sheet whereby said second kraft paper support sheet separates said metallic foil from said scrim web;

said second surface of said first kraft paper insulating support sheet adhesively bonded to the insulation panel for application of said facing barrier to the panel providing improved insulative properties and structural strength to the insulation panel.

15. The facing barrier as defined in claim 14 wherein said second insulating support sheet has a material thickness greater than said first insulating support sheet.

\* \* \* \* \*